United States Patent
Shcherbakov et al.

(10) Patent No.: US 8,462,483 B2
(45) Date of Patent: Jun. 11, 2013

(54) MULTILAYER ANODE

(75) Inventors: Igor Shcherbakov, Moscow (RU); Vladimir Sleptsov, Moscow (RU)

(73) Assignee: C-K Group Ltd., Nicosia (CY)

( * ) Notice: Subject to any disclaimer, the term of this patent is extended or adjusted under 35 U.S.C. 154(b) by 385 days.

(21) Appl. No.: 12/740,987

(22) PCT Filed: Nov. 21, 2008

(86) PCT No.: PCT/RU2008/000714
§ 371 (c)(1), (2), (4) Date: Sep. 12, 2010

(87) PCT Pub. No.: WO2009/064220
PCT Pub. Date: May 22, 2009

(65) Prior Publication Data
US 2011/0007450 A1    Jan. 13, 2011

(30) Foreign Application Priority Data
Nov. 12, 2007 (RU) ................ 2007141591

(51) Int. Cl.
*H01G 9/042* (2006.01)
*H01G 9/045* (2006.01)
*H01G 9/04* (2006.01)
*H01G 9/145* (2006.01)
*H01G 9/00* (2006.01)

(52) U.S. Cl.
USPC ............ 361/509; 361/508; 29/25.03

(58) Field of Classification Search
USPC ............... 361/508, 509; 29/25.03
See application file for complete search history.

(56) References Cited

U.S. PATENT DOCUMENTS
6,865,071 B2 * 3/2005 Katsir et al. ............ 361/523
2009/0061250 A1 3/2009 Shcherbakov et al.
2009/0202784 A1 8/2009 Shcherbakov et al.

FOREIGN PATENT DOCUMENTS
| | | |
|---|---|---|
| DE | 4127743 | 3/1993 |
| DE | 102004011567 | 9/2005 |
| RU | 2217394 | 11/2003 |
| RU | 56709 | 9/2006 |
| RU | 2005140610 | 7/2007 |
| WO | WO 2006130042 A1 * | 12/2006 |

* cited by examiner

*Primary Examiner* — David M Sinclair
*Assistant Examiner* — Arun Ramaswamy
(74) *Attorney, Agent, or Firm* — Patent Jurist; Georgiy L. Khayet

(57) ABSTRACT

The invention relates to the field of electrical engineering, in particular to multilayer film electrodes for electrolytic capacitors. The proposed multilayer anode is implemented as a substrate with a developed surface on which are sequentially arrayed a conforming layer of a valve metal, which is connected by a heterojunction formed by nanoparticles of the substrate metal and of the valve metal, which are geometrically closed between each other, and an oxide coating. The substrate is connected to the film base through a nanocomposite barrier layer, which comprises a differentiated mixture of the materials being joined, whose content varies relative to each other,[so that] together they amount to 100%, where the working surface is formed in practice by the substrate metal. What is novel is that a metal with a hardness 2-4 times greater than that of the valve metal, preferably titanium, is used as the substrate material, and the pores of the valve-metal layer are limited in size to the range $1$-$10^4$ nm. The proposed technical solution has made possible improvement of the multilayer anode for an electrolytic capacitor, ensuring superior basic technical performance.

20 Claims, 1 Drawing Sheet

MULTILAYER ANODE

MULTILAYER ANODE

MULTILAYER ANODE

RELATED APPLICATIONS

This application is a nationalization under 35 U.S.C. 371 of PCT/RU2008/000714, filed Nov. 21, 2008 and published as WO 2009/064220 A3 on May 22, 2009, which claims priority under 35 U.S.C. 119 to Russian Patent Application Serial No. 2005116488, filed Nov. 12, 2007, which applications and publication are incorporated herein by reference and made part hereof.

FIELD

The invention relates to the basic elements of electrical equipment, more specifically to multilayer film electrodes for electrolytic capacitors.

BACKGROUND

The prior art is characterized by the multilayer foil anodized electrode with a highly developed surface that is described in invention DE 102004011567, H05K 3/38, 2004, on whose current-carrying substrate, which is secured to a bearing film base suitable for roll processing, are applied layers of a valve metal and an oxide coating of bimodal morphology, with the fractal-like roughness of the interfaces preserved.

Adhesion of the layers being bonded is assured mainly not through chemical reaction of the components, but through the formation, at the interface, of a nanostructured transition region with a developed surface that consists of the material of the film base and that is vacuum-deposited from the vapor phase of another material, such as aluminum, a layer of which is the anode in this case.

A metal, preferably aluminum, is spray-coated onto the ion bombardment-activated rough surface of the base in a quasi-unified process in a reduced-pressure inert-gas atmosphere. When this is done, the nanostructure is formed as a differentiated mixture of the base material and the spray-coated metal, whose amount increases as the transitional nanolayer grows, reaching 100%, since the component of the base material accordingly smoothly decreases in volume, practically disappearing on the surface of this adhesive layer.

Thus, the base material in the nanocomposite adhesive layer formed, which has a thickness of from a few nanometers to several microns, gradually transitions to the spray-coated current-carrying metal, which ensures high strength of the bond between structural elements of the anode that have related bonding.

The nanocomposite transition region ensures the lyophobicity of the connection and serves as a barrier that prevents interdiffusion at the base-substrate interface.

The strength of the adhesive joint between the current-carrying layer and the polymer base can be increased by making a transition region in an orderly fashion by forming a diamond-like nanolayer of sp3-hybridization of amorphous carbon atoms ($\alpha$-C:H) by the method of RU 2217394, C03C 17/34, G02B 5/28, 2003, which significantly improves the plastic properties of the transition region, providing elasticity to the multilayer material suitable for anode-fabrication roll technology.

Then the valve metal (preferably porous aluminum) is spray-coated by evaporation onto the surface of aluminum foil in a low-pressure inert-gas atmosphere in the presence of oxygen at a pressure 1-2 orders of magnitude lower. The working surface develops by the addition of material, not by its removal (as in conventional etching); the anode for electrolytic capacitors therefore is characterized by the use of a thinner foil as the current-carrying substrate.

Features of the dielectric oxide layer of this anode are its bimodal morphology, the dense uniform oxide discretely deposited on the developed substrate surface, and the porous oxide coating formed by electrolytic anodizing.

A shortcoming of the multilayer anode described is its unsatisfactory functional reliability due to migratory processes of interdiffusion in operation at the boundaries of autonomous inclusions of the valve metal with the materials of the adjacent substrate and oxide layers, which leads to instability of the basic technical characteristics of the electrolytic capacitor, significantly reducing its service life.

Said shortcoming is eliminated in the multilayer film anode for an electrolytic capacitor that is described in patent RU 56709, H01G 9/04, 2006, which for its technical essence and the number of its matching features has been chosen as the closest counterpart to the proposed anode.

The known multilayer anode for an electrolytic capacitor is characterized by broader engineering possibilities due to the use of different materials for the bearing film base, which are equally adapted to functional film coatings by means of an adhesive nanocomposite barrier layer.

Further, the anode has a higher specific capacitance and permittivity and, because of the high adhesive bond strength of the structural layers, also has improved mechanical properties and plasticity, which allows the multilayer anode to be fabricated by a roll process involving successive application to a film base of all coatings and layers in a quasi-unified process of ion-plasma spray-coating of materials from the vapor phase in the vacuum of a controlled atmosphere of an inert gas and a chemically active gas. This creates a general-purpose process, eliminates breaks in the flow, and lowers production costs.

Making inclusions of porous aluminum in the form of a conforming layer of an oxide coating similar to the developed substrate profile increases several-fold the contact surface of interaction with the electrolyte of the capacitor, which significantly increases its specific capacitance.

The valve metal in the form of a layer of a porous aluminum coating provides a developed open surface that is accessible for filling with electrolyte, which allows the use of solid electrolyte in the capacitor, thereby expanding the technological possibilities for using it as intended.

Process support with equipment for ion-plasma spray-coating of a valve metal with electrochemical activity ultimately is aimed as a result at creating a thicker layer of high-quality oxide to increase the working voltage of a higher-capacitance capacitor.

The bonding of the conforming layer of valve metal to the developed substrate surface by means of a heterojunction, which is a nanostructured composite consisting of the substrate material and spray-coated valve metal through diffusion driven by ions of an inert gas and a chemically active gas, makes possible expansion of the technological possibilities for making a film anode on almost any carrier by eliminating the sharp interfaces between the shaping layers.

However, a shortcoming of the known multilayer film anode, in which aluminum is used for the current-carrying substrate and the readily oxidized valve metal of the coating, consequently is the unstable geometry of the developed substrate surface that is formed, which reduces its practicality when used in an electrolytic capacitor.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
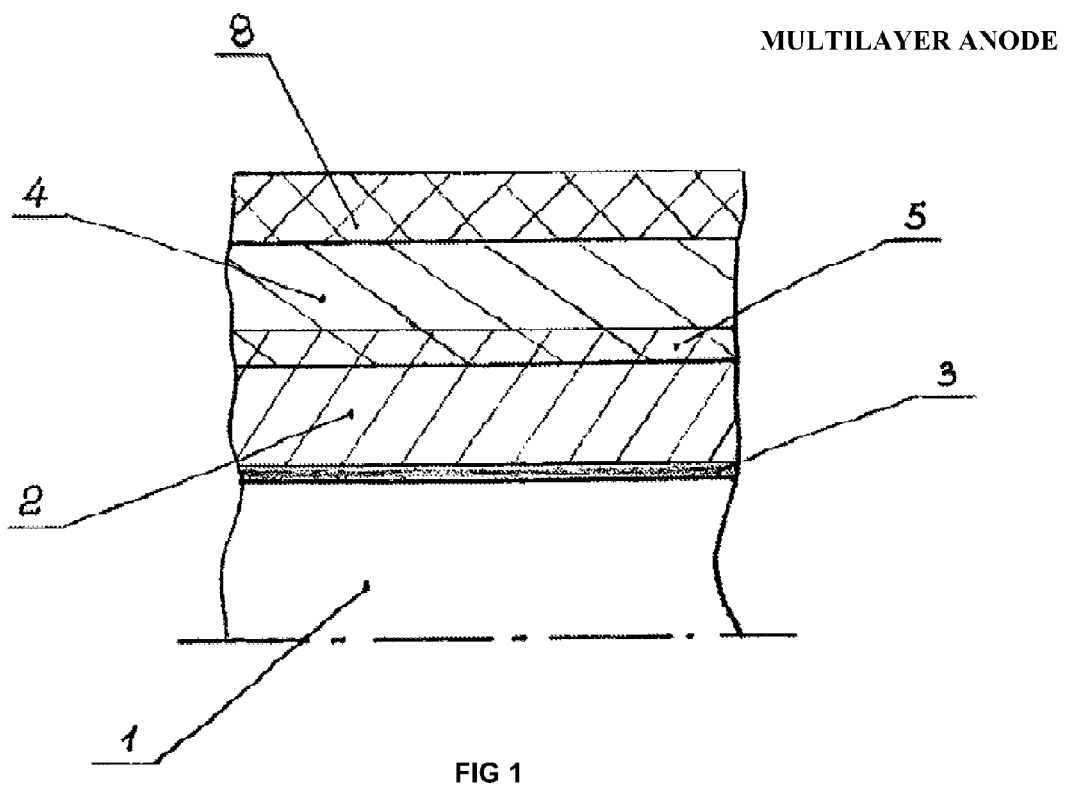
FIG. 1 is the structure of the proposed anode, in accordance with an example embodiment.

The challenge that the present invention is intended to meet is to increase the functional reliability and basic technical performance of the multilayer anode when used in electrolytic capacitors.

The required technical result is attained by virtue of the fact that in the known multilayer anode for an electrolytic capacitor, which contains a current-carrying foil substrate made of spray-coated metal with a developed surface on which are successively arrayed a conforming layer of valve metal of chemically active aluminum with an adjustable volume porosity and an oxide coating, with the substrate and the conforming layer of valve metal connected by means of a heterojunction formed by nanoparticles of the substrate metal and the valve metal that are geometrically closed with each other, so that the substrate is connected to the film base through a nanocomposite barrier layer, which is a differentiated layer of connected materials whose content varies relative to each other with increasing thickness of the layer where the working surface is practically formed by the substrate metal, according to the invention a metal with a hardness greater by a factor of 2-4 than that of the valve metal, preferably titanium, is used as the substrate material, and the pores of the valve-metal layer are limited in size to the range $1\text{-}10^4$ nm.

The distinctive features have made possible improvement of the multilayer anode for an electrolytic capacitor by ensuring better basic technical performance.

The selection of titanium as the substrate material in a multilayer anode was dictated by engineering and adhesive compatibility with the spray-coated aluminum of the valve layer, which is necessary in principle for stable operation in an electrolytic capacitor.

The use of titanium, whose Brinell microhardness is about 600 MPa, as the material of the current-carrying substrate has made possible stabilization of the microstructural profile of the developed surface onto which is spray-coated chemically active aluminum, which forms a conforming layer with a microhardness of 150-250 MPa, which is lower by factors of 4 and 2.4, respectively.

When a substrate metal with a hardness that exceeds that of the valve metal aluminum, which is best suited for these purposes—by a factor of less than 2 is used, it is not possible to obtain stable geometry of the transitional nanostructure of their interconnection for practical use as intended.

A substrate metal with a hardness that exceeds that of the valve metal by a factor of more than 4 creates brittleness of the multilayer film compound, which limits its use as an anode in an electrolytic capacitor.

In the heterojunction a double electrical layer that significantly increases the adhesion of their gapless contact is formed at the interfaces of the adjoining nanoparticles of the substrate metal and the valve metal (titanium-aluminum). This increases and stabilizes the working electrical characteristics of the electrode foil in operation.

Making a heterojunction from nanoparticles of titanium and aluminum that are geometrically closed between each other creates practically hermetic sealing of the interfaces, imbuing the adhesive layer so formed with barrier properties, thereby preventing interdiffusion. This makes it possible to preserve the electrophysical properties of a multilayer film anode unchanged when it is operated in an electrolytic capacitor.

An optimized pore size in the chemically active aluminum of the conforming layer formed, which is applied to the developed surface of the titanium substrate, is regulated, through vacuum ion-plasma spray-coating process parameters, in the range from 1 to $10^4$ nm with the following limitations.

If the pore size exceeds $10^4$ nm, the effective surface area of the nanoporous structure of the valve metal is insufficient to achieve the capacitor capacitance needed in practice, since they are physically directly proportional.

If the pore size is smaller than 1 nm, the electrolyte does not penetrate inward, and the developed surface of the pore space therefore is not involved in forming the capacitance of the capacitor, which significantly degrades its electrical characteristics.

Consequently, every significant feature is necessary, and the aggregate of these features in a stable interrelationship is sufficient, to achieve a novelty of quality that is not inherent in the features taken separately. This makes it possible to meet the stated technical challenge not through the sum of effects, but with a new supereffect from the sum of the features.

A comparative analysis of the proposed technical concept with identified state-of-the-art counterparts, from which the invention does not obviously follow for an electrical-engineering specialist, showed that the invention is not known, and with consideration for the possibility of practical series production of a multilayer anode by a roll-type process the conclusion may be drawn that the criteria of patentability are met.

The essence of the invention is explained by the drawings, which are purely for illustrative purposes and do not limit the scope of the claims.

FIG. 1 shows the thickness of the different films and layers conditionally and not to scale.

The multilayer film anode is made by a roll process in vacuum modules that are mounted on a common stand and connected by lock chambers that are equipped with a power supply for the ion sources and magnetron systems, an evacuation system, and a drive for winding the endless film being processed.

Various materials such as aluminum, copper foil, polyester film, and others can be used as bearing base 1 of multilayer anode.

Process drums that are cooled to a temperature of −50 to −100° C. to prevent burnthrough of film that is nearby during processing are installed in the modules for plasma magnetron spray-coating of materials from the vapor phase.

The surface of base 1 is first cleaned and activated by ion bombardment, achieving further processing of the relief and increasing the development factor several-fold, that is, the ratio of the actual surface area to the geometric surface area, in particular in the range 100-1000.

In an evacuated atmosphere of an inert gas (argon) with an admixture of a chemically active gas (oxygen), a current-conducting layer of a metal (titanium) 12-50 μm thick is deposited onto base 1, creating foil substrate 2.

When this is done, an adhesive barrier layer 3 in the form of a nanocomposite comprising a content-differentiated mixture of the materials being joined is formed at the interface.

Being mutually complementary, the content of the material of base 1 and the deposited titanium of substrate 2 are mutually present in quantities ranging from 100% to 0, respectively: base 1 (100-0) and titanium (0-100).

Then titanium is deposited from the vapor phase onto the titanium surface of adhesive layer 3 in the quasi-unified ion-plasma process, forming the current-carrying layer of substrate 2.

An important detail is that the process of intermixing of the materials being joined takes place at a time when the process of activation of the surface of base 1 has not yet been completed. As a result of the quasi-unified process, the nanocomposite of adhesive layer 3, where the material of base 1 passes on the surface into the deposited metal (titanium), which then is formed into substrate 2, is built.

In particular, a nanosized (10-50 nm) coating of amorphous carbon in the sp3-hybridized state is formed by plasma deposition on the modified polyester film of base 1 from cyclohexane fumes—this is a diamond-like ($\alpha$-C:H) adhesive layer, which is a potential barrier that interacts with the titanium.

Adhesive layer 3 is a barrier to the active components of the polymer of base 1, which ensures the stability of the electrophysical properties of the anode in operation.

The formation of barrier layer 3 as a nanocomposite (with a thickness of 20 nm to 20 μm) ensures a high-adhesion bond among practically all the materials required to create the film anode.

The composite structure of adhesive layer 3 ensures a lyophilic seal of base 1, improving its operational properties.

For subsequent deposition of the valve metal—porous aluminum, which forms conforming layer 4—in the chamber of working modules, air is evacuated to a pressure of $(5-1) \times 10^{-5}$ mm Hg; then argon is admitted to the ion sources to a pressure of $(5-10) \times 10^{-4}$ mm Hg and oxygen is added in a quantity of 30-40 vol. %. The pressure in the chamber of working modules varies over the range from 0.1 to 0.0001 mm Hg.

Then the ion sources are turned on, with a voltage of 3.0-4.5 kV and a discharge current of 250-400 mA supplied from the power supply; as a result, plasma spray-coating of aluminum takes place; aluminum atoms condense on substrate 2, forming thin porous layer 4 up to 100 nm thick.

Figure 2:
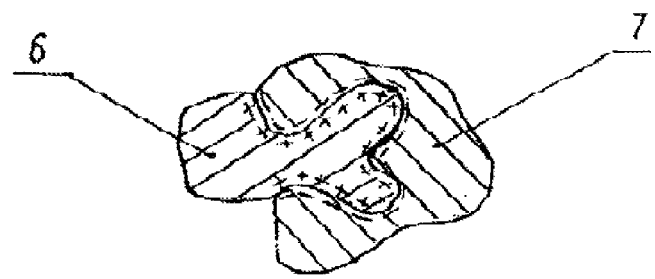
FIG. 2 is a fragment of the heterojunction, in accordance with an example embodiment.

Growing layer 4 of the valve metal is processed with argon and oxygen ions, resulting in the creation of heterojunction 5 in the form of a nanostructured composite that includes nanoparticles 6 and 7 (FIG. 2) of the porous valve metal of layer 4 and the material of substrate 2, which are aluminum and titanium, respectively.

Nanoparticles 6 and 7 of heterojunction 5 form a geometric closure among themselves; when this occurs, a double electrical layer of opposite potential forms at the interfaces, significantly increasing the adhesive forces and stabilizing the geometry of the developed surface of base 2 and of the information matrix of the product as a whole.

Ion-packed heterojunction 5 ensures high adhesion of the bond between adjacent layers 2 and 4 and serves as a barrier that prevents migratory processes between substrate 2 and porous layer 4 of the valve metal.

When magnetron spray-coating of layer 4 of porous aluminum is assisted by ions of an inert gas (argon), diffusion of the composite of heterojunction 5 is stimulated. This ensures uniformity of the mutual distribution of the structural elements of adjacent layers 2 and 4. When this occurs, nanoparticles 6 of the aluminum being spray-coated intergrow into titanium nanoparticles 7, forming a geometric closure among themselves (FIG. 2), and structure heterojunction 5 with high adhesive and barrier properties.

The nanostructure of the composite of heterojunction 5 performs the role of storage unit for the layer's internal energy due to the growth of radiation defects resulting from ion-beam processing of the surface of titanium substrate 2 and of valve layer 4, which is formed from porous, chemically active aluminum. When this occurs, the interfaces of nanoparticles 6-7 of heterojunction 5 are strengthened, and strain hardening and partial dissolution take place, impeding the formation and movement of dislocations, that is, cracking is eliminated in adjacent structural layers 2 and 4 of the anode.

Assistance with ions of a chemically active gas (oxygen) ensures that controlled electrochemical activity of layer 4 of the valve metal is achieved. As a result, a bulk-porous layer 4 of aluminum that is characterized by the developed surface of substrate 2 for interaction of the anode with the electrolyte of the capacitor forms on heterojunction 5.

The thickness of porous-aluminum layer 4 is from 0.05 to 30 μm.

The number and structure of the pores in layer 4 of deposited aluminum are determined from the mathematical model used in experiment planning as a function of many variables: the composition and pressure of the gaseous atmosphere, the temperature of substrate 2, the voltage and discharge current of the magnetrons, and the number of electrons that pass onto substrate 2 as layer 4 grows.

By varying these parameters it is possible to vary the pore diameter over a wide range, in the optimal range from 1 nm to $10^4$ nm.

If larger pores are prevalent in layer 4, then a structure that increases the capacitance of the capacitor severalfold is obtained.

The prevalence of smaller pores in layer 4 produces an increase in its electrochemical activity.

The growth rate of porous-aluminum layer 4 is 1.5 μm/min.

The presence of controlled volume porosity in the optimized range of sizes and the creation, by ion-beam processing, of radiation defects in layer 4 of the valve metal result in an increase in the electrochemical activity of the material, which can be changed in a controlled fashion by adjusting the number and size of the pores in the bulk of the spray-coated aluminum.

The porous structure formed in this manner in spray-coated aluminum layer 4 more readily undergoes electrochemical oxidation, with the formation of a less mechanically stressed oxide layer 8.

As a result it follows that conforming layer 4 of porous aluminum on the stabilized profile of titanium substrate 2, which is applied in a vacuum under the conditions of ion-plasma processing, makes it possible to obtain a thicker, packed oxide coating 8 of a qualitatively new multilayer anode (FIG. 1). This is a precondition for creating high-voltage electrolytic capacitors with a working voltage of more than 600 V.

Nanosized pores inside spray-coated-aluminum layer 4 produce an increase in the capacitance of the anode in oxide-coating layer 8, which is suitable for use in low- and medium-voltage capacitors (30-60 V and 200-250 V, respectively).

The relative increase in the number of pores in the bulk of aluminum layer 4 that are in the optimized micron range practically makes it possible to produce a high-voltage foil with a functional coating 4 that is 1 μm thick and that produces a buildup of a 700-V charge, based on the well-known characteristic of 1.5 nm/V for oxide coating 8.

Wound into a roll in the unloading module, the finished multilayer anode is removed from the unit for further electrochemical oxidation (molding) at the specified working voltage, forming oxide coating 8 on layer 4.

The proposed multilayer anode is made according to a quasi-unified process flow diagram, with step-by-step change of the conditions and parameters of the vacuum processes used in ion-beam processing of the surface and plasma spray-coating of the valve metal with the assistance of ions of neutral and chemically active gases.

The invention makes it possible, by using known processing techniques, to obtain a qualitatively new interrelationship among the structural components of a multilayer anode for electrolytic capacitors that is universally suitable for use with both liquid and solid electrolytes.

The proposed anode is characterized by a stable structure that improves functional parameters, and in particular by a significant increase in specific capacitance.

The barrier properties of the nanostructured heterojunction, in which mechanical stresses are practically eliminated, ensure the stability of the electrical performance of the anode over its entire, significantly longer operating life in an electrolytic capacitor.

The technology for producing a multilayer anode with a volume-porous conforming layer of spray-coated valve metal (aluminum) on the developed surface of the current-carrying titanium substrate, which are adhesively bound through the nanocomposite barrier to the bearing base of different materials, has been refined and is suitable for commercial use. The proposed technical concept creates the fundamental possibility of creating, on the basis of the described multilayer anode in a unified fabrication process of ion-plasma spray-coating, the end product—an electrolytic capacitor—through the successive application to its oxide coating of layers of solid electrolyte and valve metal, which performs the functions of a cathode.

The invention claimed is:

1. A multilayer film anode for an electrolytic capacitor, the multilayer film anode comprising:
   a current-carrying foil substrate of spray-coated metal, the current-carrying foil substrate having a porous surface;
   a conforming layer of a valve metal with a porosity of adjustable volume, the conforming layer connected to the current-carrying foil substrate by means of a heterojunction formed by a plurality of nanoparticles of the spray-coated metal and the valve metal, the plurality of nanoparticles geometrically interlocking with each other to create a hermetic sealing with barrier properties, thereby preventing interdiffusion between the conforming layer and the current-carrying foil substrate; and
   an oxide coating connected to the conforming layer.

2. The multilayer film anode of claim 1, wherein the valve metal is a chemically active aluminum.

3. The multilayer film anode of claim 1, further comprising a film base, the film base being bound to the current-carrying foil substrate via a nanocomposite adhesive barrier layer.

4. The multilayer film anode of claim 3, wherein the film base includes one or more of the following: aluminum, copper, and polyester.

5. The multilayer film anode of claim 3, wherein the nanocomposite adhesive barrier layer includes a mixture of connecting materials, the mixture of the connecting materials proportionally changing as the nanocomposite adhesive barrier layer grows.

6. The multilayer film anode of claim 1, wherein the current-carrying foil substrate consists of a metal having hardness 2-4 times higher than that of the valve metal.

7. The multilayer film anode of claim 1, wherein the spray-coated metal is titanium.

8. The multilayer film anode of claim 1, wherein the pores of the valve-metal are $1\text{-}10^4$ nm in size.

9. The multilayer film anode of claim 1, wherein the conforming layer has a microhardness of 150-250 MPa.

10. A method of production of a multilayer film anode for an electrolytic capacitor by a roll-type process, the method comprising:
    cleaning and activating of a film base by ion bombardment, the ion bombardment resulting in a surface development, the surface development being the ratio of the actual surface area to the geometric surface area;
    depositing on the film base, in an evacuated atmosphere of an inert gas with an admixture of a chemically active gas, a current-conducting layer of a metal and forming an adhesive barrier layer between the film base and the current-conducting layer, the adhesive barrier layer consisting of a nanocomposite mixture of materials of the film base and the current-conductive layer;
    depositing a porous valve metal on the current-conducting layer to form a conforming layer, wherein growing the porous valve metal being processed with the inert gas and the chemically active gas, thus resulting in the creation of a heterojunction a form of a nanostructured composite that includes nanoparticles of the porous valve metal and the current conducting layer; and
    forming an oxide coating layer on top of the conforming layer, nanosized pores inside the porous valve metal producing an increase in a capacitance of the multilayer film anode in oxide coating layer.

11. The method of claim 10, wherein the porous valve metal is porous aluminum.

12. The method of claim 11, wherein the porous aluminum is up to 100 nm thick.

13. The method of claim 10, wherein the deposition of the current-conducting layer is from a vapor phase onto a surface of the adhesive barrier layer and formation of the adhesive barrier layer is performed in a unified ion-plasma process by intermixing of the materials at a time when activation of the film base is not completed.

14. The method of claim 10, wherein the adhesive barrier layer includes a diamond-like nanosized coating of amorphous carbon in the sp3-hybridized state, the coating formed by plasma deposition on the film base from cyclohexane fumes.

15. The method of claim 10, wherein the nanosized coating is 10-50 nm wide.

16. The method of claim 10, wherein the metal is titanium, the inert gas is argon and the chemically active gas is oxygen.

17. The method of claim 10, wherein the metal is 12-50 mkm thick.

18. The method of claim 10, wherein the surface development is in a range 100-1000.

19. The method of claim 10, wherein the nanosized coating is 20 nm to 20 μm to ensure a high-adhesion bond among materials creating the multilayer film anode.

20. The method of claim 10, wherein thickness of porous valve metal is from 0.05 to 30 μm.

* * * * *